United States Patent [19]

Eastman et al.

[11] Patent Number: 4,610,902
[45] Date of Patent: Sep. 9, 1986

[54] ROOFING MEMBRANES AND SYSTEM

[75] Inventors: Robert J. Eastman, Littleton; Henry S. Goodspeed, Morrison, both of Colo.

[73] Assignee: Manville Service Corporation, Denver, Colo.

[21] Appl. No.: 774,514

[22] Filed: Sep. 10, 1985

[51] Int. Cl.⁴ .......................... B32B 3/28; E04D 1/08
[52] U.S. Cl. ...................................... 428/57; 52/309.1; 52/518; 427/186; 428/182; 428/184; 428/332; 428/489
[58] Field of Search ............... 428/141, 143, 172, 291, 428/489, 332, 182, 179, 57, 184; 52/309.1, 518; 427/186; 156/71

[56] References Cited

U.S. PATENT DOCUMENTS

| | | | |
|---|---|---|---|
| 2,190,654 | 2/1940 | Eichorn | 428/172 |
| 3,007,808 | 11/1961 | Smith | 428/489 |
| 3,460,961 | 8/1969 | Young et al. | 428/480 |
| 3,581,631 | 6/1971 | Samson et al. | 428/489 |
| 4,288,959 | 9/1981 | Murdock | 52/518 |
| 4,320,174 | 3/1982 | Rabinovitch | 428/403 |
| 4,421,807 | 12/1983 | Clausing et al. | 428/489 |

Primary Examiner—Paul J. Thibodeau
Attorney, Agent, or Firm—John D. Lister; Cornelius P. Quinn; Gregory A. Evearitt

[57] ABSTRACT

A laminate composition useful as a roofing membrane comprising a top and a bottom layer of plastic film bonded together by a modified bitumen material, the top layer of said laminate either containing or being surface coated with an ultraviolet light resistant and absorbing agent. The inventive laminate has superior elongation and flexibility properties compared to prior art roofing membranes. Additionally, the inventive laminate is light weight and has good aesthetic qualities.

Also provided are a novel embossed laminate, also useful as a roofing membrane, and a novel roofing system comprising a plurality of partially overlapping inventive roof membranes suitably attached to a roof deck.

8 Claims, 9 Drawing Figures

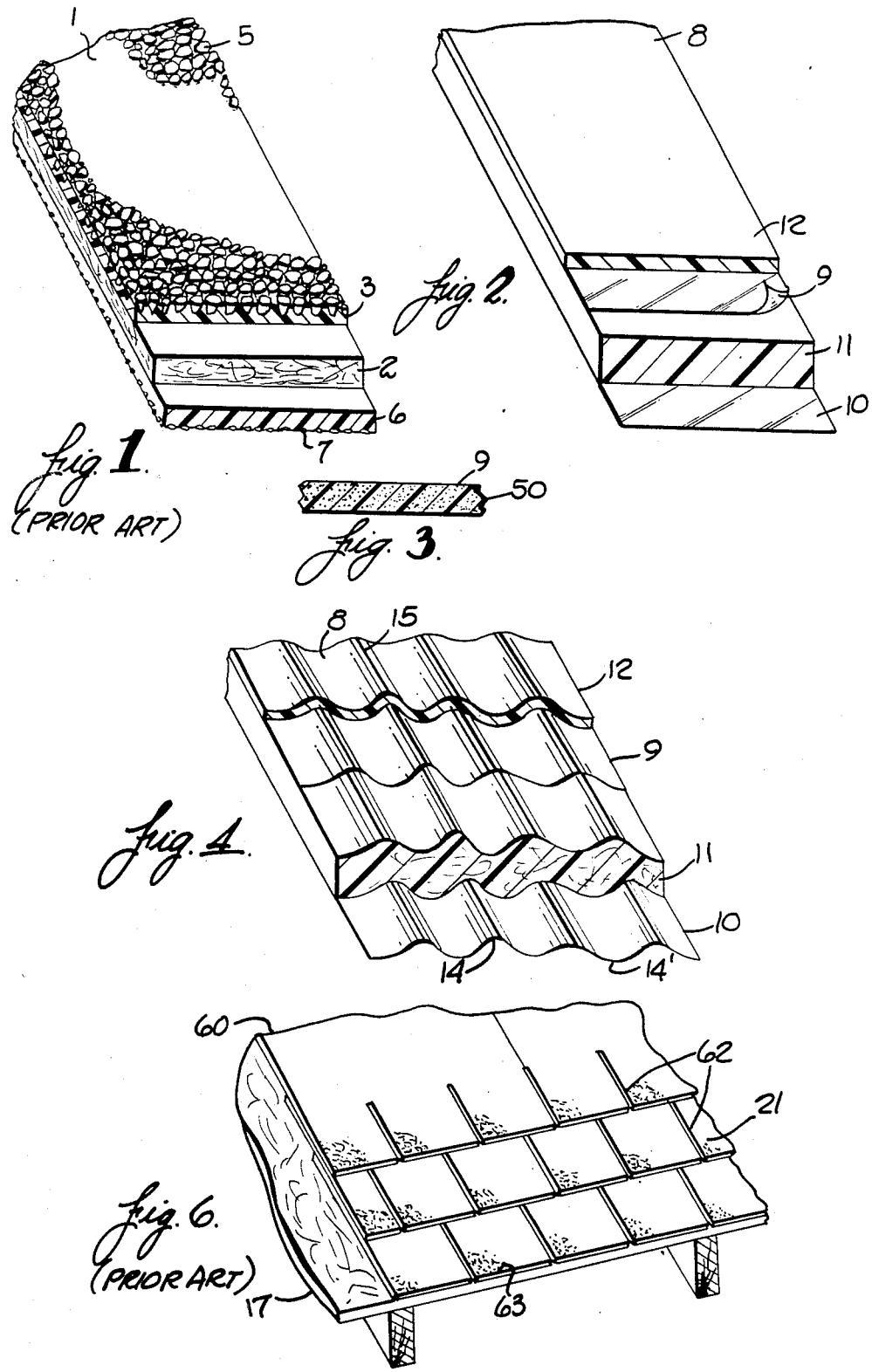

ROOFING MEMBRANES AND SYSTEM

FIELD OF THE INVENTION

This invention relates to a novel laminate composition useful as a roofing membrane. It also relates to a novel embossed laminate composition useful as a roofing membrane. It further relates to a novel roofing system comprising a laminate composition useful as a roofing membrane.

BACKGROUND OF THE INVENTION

The use of roofing membranes as a waterproofing material on buildings is well known. The typical type of roofing membrane consists of a base sheet of a sheet-like material such as, for example, paper, felt, fabric, synthetic polymer film, woven or non-woven fabric, glass fibers, or metal foil with a bitumen layer coated on both faces of the base sheet. Mineral granules or powder such as fine gravel, sand, or talcum are embedded in the surface of the bitumen layer in order to suppress the stickiness of the bitumen and also to protect the exposed bitumen layer from ultraviolet light after the bituminous roofing membrane is applied on site. The bottom of the membrane is covered with a layer of asphalt which is embedded with a back surfacing material such as sand to prevent the membrane from sticking to another membrane material during shipping and handling.

The above-described conventional roofing membrane is not without problems, however. The asphalt impregnated product has limited elongation properties which make it tend to buckle or crack upon thermal expansion and contraction. Additionally, the resulting roof membrane has only a minimal aesthetic value. Also, because the granules are embedded in the surface layer, gaps exist between the granules such that complete protection of the bitumen (or asphalt) from ultraviolet light may not be achieved. Consequently, the conventional roofing material suffers from commercial limitations.

Detecting that there was both a need and a demand in the building industry for an improved roofing membrane product, Applicants devised a novel laminate material which makes an economical yet excellent roofing material.

SUMMARY OF THE INVENTION

In accordance with one embodiment of the present invention, Applicants have provided a novel laminate material which makes an excellent roofing membrane. The inventive laminate comprises a top and a bottom layer of plastic film bonded together by a modified bitumen material, the top layer of the laminate either containing or being surface coated with an ultraviolet light resistant and absorbing agent.

The present invention has the advantages of having greater elongation and flexibility properties compared to prior art roofing membrane materials. The modified bitumen has a much greater elasticity that the conventional bitumen of prior art roofing membranes and hence is less susceptible to buckling or cracking when exposed to temperature fluctuations. Furthermore, the modified bitumen adheres better to the plastic film than unmodified bitumen and thus is a more effective bonding agent. The plastic film utilized in the laminate of the present invention has more elasticity than the paper, felt, glass mat, and other materials used as facing in prior art membranes. Additionally, the laminate composition of the present invention is more aesthetically appealing than prior art membranes.

Whereas the prior art membranes have granules embedded in the asphalt covered surface of the membrane for protection against ultraviolet light, it is within the scope of the present invention to apply an ultraviolet light resistant and absorbing agent in the form of a paint or mastic over the top surface of the plastic film, or alternatively, the top layer of plastic film can itself contain an ultraviolet light resistant and absorbing agent typically in the form of some kind of pigmentation. Both of these arrangements favor maximum aesthetic appeal as compared to embedding the granules in the surface. Additionally, the present invention does not contain a backing material such as sand, the absence of which also lends itself to greater aesthetics and easier overall construction of the roofing membrane. The absence of embedded material in the present invention also allows for a lighter weight roofing membrane compared to prior art membranes. This is a real advantage in shipping and handling of the inventive roofing membrane. Thus, by the inventive construction, maximum ultraviolet light resistance and absorption as well as maximum aesthetics and ease of installation are achieved.

In accordance with another embodiment of the present invention, there is provided an corrugated laminate composition useful as a roofing membrane. The corrugated laminate comprises a top and a bottom layer of plastic film bonded together by a modified bitumen material, the top layer of the laminate either containing or being surface coated with an ultraviolet light resistant and absorbing agent.

The corrugated laminate has the advantage of having an obvious aesthetic appeal compared to the prior art roofing membranes which typically cannot be corrugated. Additionally, the corrugating imparts an accordion type effect to the laminate which allows for greater elongation and flexibility in the lengthwise direction of the laminate. Additionally the corrugated laminate is highly resistant to wind uplift because of the laminate's stiffness and rigidity in the width direction also due to the accordion effect. The use of modified bitumen in the inventive corrugated laminate also allows the laminate to maintain its corrugating pattern.

In accordance with still another embodiment of the present invention, there is provided a roofing system for protecting an underlying sloped roof deck. The inventive roofing system comprises a plurality of partially overlapping roofing membranes such that each individual roofing membrane is suitably attached to the roof deck. Additionally, each roofing membrane is a laminate composition, preferably an corrugated one, as described herein above.

The inventive roofing system allows for greater utilization and exposure of each individual roofing membrane as compared to prior art roofing systems as will be illustrated and explained more fully herein later. Additionally, the inventive roofing system is easy to construct.

Other aspects and the several advantages of the present invention will be discussed more fully in, and will be apparent from, the disclosure, the Claims, and the drawings.

BRIEF DESCRIPTION OF THE DRAWINGS

FIG. 1 is a partial cross sectional view showing the structure of a laminated bituminous prior art roofing membrane.

FIG. 2 is a partial cross sectional view showing the structure of the inventive laminated roofing membrane.

FIG. 3 is a partial cross sectional view of the edge on an corrugated roofing membrane illustrating the incorporation of an ultraviolet light resistant and absorbing agent into the plastic film of the inventive laminate.

FIG. 4 is a partial cross sectional view showing the structure of the inventive corrugated laminated roofing membrane.

FIG. 6 is a partial pictorial view illustrating the construction of a prior art roofing system utilizing three tab shingles.

DETAILED DESCRIPTION OF THE INVENTION

Figure 7:
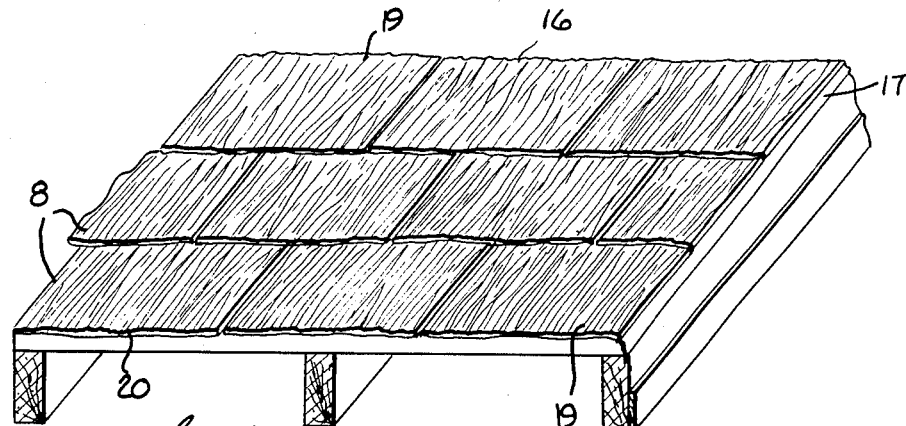
FIG. 7 is a partial pictorial view illustrating the construction of an inventive roofing system.

As explained herein earlier, the inventive laminate comprises a top and a bottom layer of plastic film bonded together by a modified bitumen material, the top layer of the laminate either containing or being surface coated with an ultraviolet light resistant and absorbing agent.

The terms "bituminous" and "bitumen", as used throughout this specification may be replaced with the term "asphalt" which substantially means petroleum asphalt.

The term "modified bitumen" as used herein signifies a bitumen material which has incorporated in it an agent to improve the elongation, flexibility, temperature susceptibility, and adhesive properties of ordinary bitumen.

One well known class of modifiers are thermoplastic elastomers or thermoplastic rubbers. These agents include, but are not limited to, styrene-butadiene-styrene (SBS), styrene-isoprene-styrene (SIS), and styrene-ethylene-butylene-styrene (SEBS). These agents may simply be blended into the bitumen.

While only a very small amount of the thermoplastic elastomer or rubber modifier needs to be present in the compound bitumen in order for desirable elongation, flexibility, temperature resistance, and adhesiveness properties to be achieved, preferably about 3–20 wt % of the modifier is used based upon the weight of the compound bitumen, and most preferably 6–15 wt %.

Another class of modifying agents which can be used in the present invention to impart the desired elongation, flexibility, adhesiveness, and temperature resistance properties to the asphalt are polyurethane modified asphalt compounds. Polyurethanes are made by the generalized reaction between a polyol and a polyisocyanate. In the practice of the present invention, the polyurethane modified asphalt compound can be prepared by preblending about 65 parts of a cut-back asphalt or asphaltic flux with about 35 parts of a polyol. Subsequently about 10 parts of a polyisocyanate are added to the premix and allowed to react with the premix to form a polyurethane modified asphalt compound. The curing of the polyurethane compound may be accelerated with various polyurethane curing catalysts as are commercially available and known to those skilled in the art. For example, organotin compounds such as dibutyltin diacetate and dibutyltin dilaurate can be utilized.

The modified bitumen may also contain one or more inert fillers. These fillers are generally finely divided solids. They are included to improve the properties of the inventive laminate composition. For example, the fillers are typically used to add weight (if desired), act as extenders thereby increasing the volume of the composition at minimal cost, or act as reinforcing agents thereby providing increased strength. Examples of such fillers include, but are not limited to, perlite, ground rubber, organic fibers such as polyester fibers, mica powder, alumina, glass fibers, calcium carbonate, magnesium carbonate, silica, and carbon black.

Whatever inert fillers are used (with the exception of fibers) should be finely divided such that they are easily blended with the other materials of the modified bitumen composition and do not make it lumpy. Preferably, the average particle diameter of such an inert filler will be between about 40 and 300 microns.

The plastic film utilized in the present invention should be one which imparts structural integrity to the laminate as well as be compatible with the modified bitumen layer. The categories of plastic film utilized in the present invention include, but are not limited to homopolymers of cellulosics, polyamides, polycarbonates, polyesters (PET film preferred), polyolefins, acrylics such polymethyl methacrylate, polystyrene, polyurethanes, and polyvinyl chlorides, and copolymers and terpolymers of the above.

Because of the difference and amounts of possible modifying agents used in the bitumen layer portion of the inventive laminate and the therefore different temperature requirements for processing the compound bitumen, one skilled in the art will recognize the suitability of using certain films as opposed to others depending upon the temperature requirements. For example, an SBS modified bitumen requires greater temperatures to process than a polyurethane modified bitumen. Therefore, one skilled in the art recognizes that in the former situation a more temperature resistant plastic film such as PET ("Mylar film") would have to be utilized than in the latter situation where a lower temperature resistant film such as a PVC based one could be utilized.

Although only one sheet of plastic film is typically used in the top and bottom layer of the inventive laminate, it is possible within the scope of the present invention that one or both layers will contain two or more sheets of plastic film of various suitable polymers. It is possible within the scope of the present invention that the sheets of plastic film can be coextruded from two or more polymers.

In the present invention, the top layer of the inventive laminate either contains or is surface coated with an ultraviolet light resistant and absorbing agent. This agent is necessary for protecting the top layer of polymeric film from degradation from UV light as well as preventing transmittance of UV light through the polymeric film to preclude degradation of the modified bitumen core. As used herein the word "contains"

means that the sheet(s) of plastic film comprising the top layer has (have) the UV light resistant and absorbing agent (such as pigment or an ultraviolet light stabilizer) interdispersed therein. Alternatively, a UV light protective agent may be applied to the top surface by surfacing it with a layer of suitable compound such as an acrylic based mastic. Besides functioning to provide increased protection and durability to the inventive laminate, the UV light resistant and absorbing agent also imparts an aesthetic quality to the invention.

With reference to FIGS. 1 and 2, a prior art roofing membrane and the inventive roofing laminate are shown.

In FIG. 1, the prior art roofing membrane 1 contains a sheet material 2 saturated on both the top and bottom sides with layers 3 and 6 respectively of unmodified bitumen. Bitumen layer 3 has embedded therein granules 5 which provide UV light protection to roofing membrane 1. Asphalt layer 6 contains a back surfacing material 7 such as sand.

In contrast, the inventive laminate 8 illustrated in FIG. 2 contains a top layer 9 and a bottom layer 10 of plastic film bonded together by a modified bitumen layer 11. Layer 12 is an ultraviolet light resistant and absorbent agent such as an acrylic mastic.

Generally, the modified bitumen layer 11 will be about 30-300 mils. in thickness, preferably about 50-100 mils. Typically, the top and bottom layers 9 and 11 of plastic film will individually be about 0.25-5 mils thick, preferably about 0.5-3 mils thick. Additionally, the UV light protective layer 12 will typically have a thickness of 2-5 mils. The overall thickness of the inventive laminate roofing material 8 will generally be in the range of about 32-315 mils, preferably about 53-111 mils.

The inventive laminate 8 is typically made by an on line process wherein a layer of modified bitumen is applied to at least one bottom sheet of plastic film. A top layer of plastic film is then added. The resulting laminated structure is them compressed together on-line with the use of nipped thickness sizing rollers. It the bitumen modifier is a thermoplastic rubber or elastomer, then the resulting compressed laminate is allowed to cool. If the bitumen modifier is a polyurethane modified asphalt compound, then the laminate is compressed through heated rollers to speed the cure of the polyurethane. If not already incorporated into the top film, the ultraviolet light protective agent is subsequently applied to the top surface of the laminate in any suitable manner such as by spray painting.

The inventive laminate structure is thus economical and easy to construct. Both the modified bitumen layer and the plastic film provide greater elongation and flexibility properties than achieved by prior art roofing membranes. Consequently, the inventive roofing membrane will not crack or buckle under temperature fluctuations. Furthermore, the UV light resistant and absorbing agent efficiently maximizes its protective functions while also lending an aesthetic quality to the laminate structure. When the UV protective agent is applied as an acrylic mastic or alternatively, as shown in FIG. 3 where the plastic film 9 contains interdispersed therein a UV light resistant and absorbing agent in the form of a pigment 50, greater protection is achieved than in the case of where granules are embedded in the top layer of asphalt as done in the prior art.

In another embodiment of the present invention, an embossed laminate structure is provided for use as a roofing membrane. The corrugated laminate comprises a top and a bottom layer of plastic film bonded together by a modified bitumen material, the top layer of the corrugated laminate either containing or being surface coated with an ultraviolet light resistant and absorbing agent.

The nature and construction of the top and bottom plastic layers of film, the modified bitumen, and the UV light protective agent of the inventive corrugated laminate are the same as disclosed herein above in a previous embodiment of the present invention.

By corrugating the entire laminated structure, both aesthetic and functional advantages are imparted to a roof membrane material compared to the prior art roofing membrane of FIG. 1 which cannot be corrugated.

FIG. 4 shows an corrugated inventive laminate 8 with plastic film layer 9 and 10 bonded together with modified asphalt layer 11. Layer 12 is a UV light resistant and absorbing agent. Reference numerals 14 and 14' illustrate an corrugating pattern imparted to laminate 8. Reference numeral 15 illustrates the shadow effect created by such an corrugating pattern.

Figure 5:
FIG. 5 is a partial cross sectional of the edge of an corrugated roofing laminate view illustrating the randomness aesthetic effect achieved by corrugating.

FIG. 5 shows in greater detail the randomness and accordion aesthetic effects imparted to the inventive laminate as viewed from its edge by an corrugating pattern 14 and 14'. The depth of the corrugating pattern is typically no greater than about 0.5 inches, preferably no greater than about 0.3 inches.

As mentioned earlier, by corrugating the entire laminate structure, an aesthetic quality is given to the roofing material. The corrugating pattern may be in a variety of decorative patterns such as a split wood or wood grain pattern.

Not only is the corrugating useful for imparting aesthetic qualities to the roofing membrane but it also imparts improved functional properties as well. For example, the accordion effect allows for better elongation and flexibility properties in the lengthwise direction yet makes the overall laminate material stiffer in the width direction such that it can better resist wind uplift.

The corrugated laminate of the present invention can be made by first producing the basic laminate composition according to the method detailed earlier herein and then imparting the desired pattern to the entire laminate structure with the use of rolls (heated or cooled to the appropriate temperature) having the desired simulated pattern.

In accordance with still another embodiment of the present invention, a roof system for protecting an underlying sloping roof deck is provided. The inventive roofing system comprises a plurality of partially overlapping roofing membranes such that (a) each indivdual roofing membrane is suitably attached to the roof deck and (b) each roofing membrane is a laminate composition comprising a top and a bottom layer of plastic film bonded together by a modified bitumen material, the top layer of the laminate either containing or being surface coated with an ultraviolet light resistant and absorbing agent.

The laminate of the inventive roofing system is of the same construction and composition as described herein earlier. Preferably, the laminate composition will be embossed.

FIG. 6 illustrates a prior art roofing system 60 comprising a plurality of partially overlapping three tab shingles 21 attached to a roof deck 17. Each shingle 21 contains two cut-outs 62. The cut-outs are necessary to avoid buckling and self-tearing from thermally induced expansion and contraction of the shingle. However, the cut-outs have the disadvantage of exposing the underlayer of shingles to rain. Each shingle or membrane 21 also has surface granules 63 embedded in the surface. As explained herein earlier, the embedded granules add to the overall weight of the shingle making shipping and handling of the shingle relatively more difficult. Additionally, the embedded granules have gaps in between them where no UV light protection to the shingles or membrane is provided.

FIG. 7 illustrates an inventive roofing system 16 comprising a plurality of partially overlapping laminated roofing membranes attached to a roof deck 17. Reference numeral 19 illustrates an embossing pattern on each membrane 8. Reference numeral 20 designates the randomness-accordion effect achieved by the corrugating pattern when viewing roofing membrane 8 from the edge. Besides imparting desirable functional properties to the laminate, this effect also imparts a desirous aesthetic, rough look to the laminate.

The roof deck 17 can be of any suitable conventional construction such as wood, plywood, and particle board.

The inventive roofing system allows for easy installation of the roofing membrane material to the roof deck in any suitable manner, typically by nailing.

Figure 8:
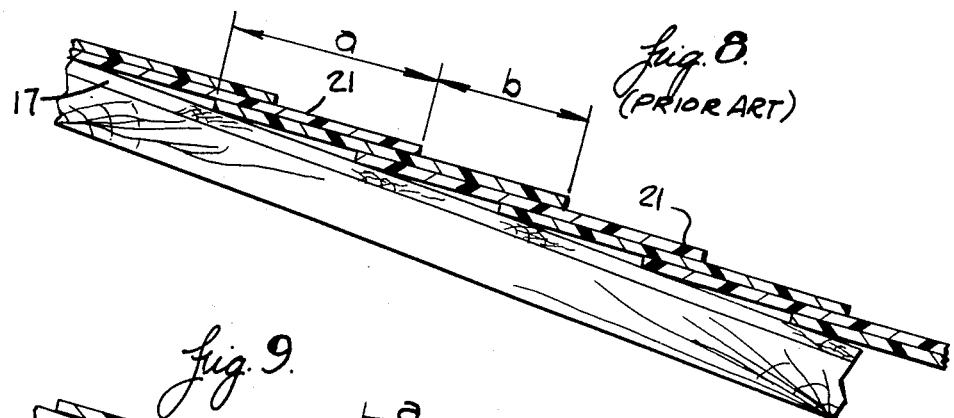
FIG. 8 is a partial cross sectional view of an arrangement of three tab roofing membranes on a roof deck of a prior art roofing system.
Figure 9:
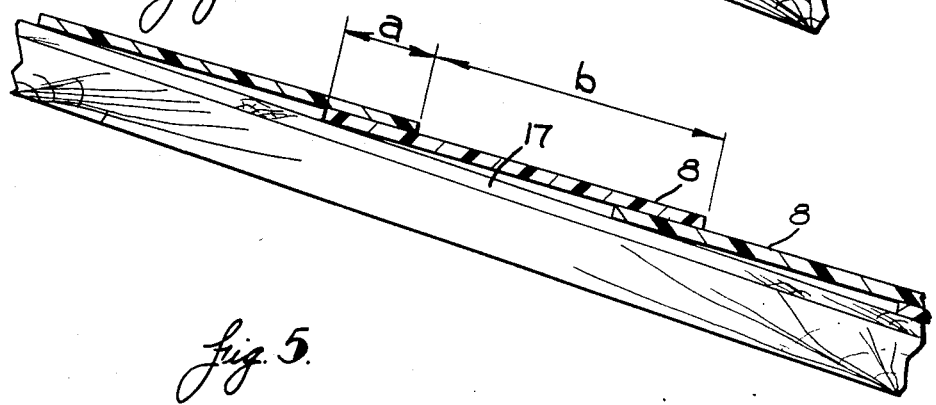
FIG. 9 is a partial cross sectional view of an arrangement of roofing membranes on a roof deck of the inventive roofing system.

FIG. 8 illustrates an arrangement of prior art three tab roofing membranes (shingles) 21 attached to a sloped roofing deck 17. The use of three tab shingles 21 in prior art roofing systems results in an inefficient utilization of the total roofing membrane material compared to the use of the inventive laminate composition 8 connected to a sloped roofing deck 17 as shown in FIG. 9. Roofing membrane 8 is not constructed in the form of a three tab shingle as in the case of membrane 21. In FIG. 8, the conventional three tab shingle 21 is typically 12 inches wide. And in the typical prior art construction and placement of three tab shingles on a roofing system the "head" portion, designated "a", of the shingle is typically 7 inches and the "butt" portion of the single, designated "b", is typically 5 inches. Thus, in the prior art consntruction only 5 inches out the total 12 inches are exposed. Contrastingly, the arrangement of inventive laminate 8 (which are not three tab shingles) in FIG. 9, achieves a greater and more efficient utilization of each roofing membrane material. The typical inventive laminate 8 will be 13 inches wide with only 3 inches "a" covered and thus 10 inches "b" exposed. Thus it can be readily seen that in the inventive roofing system of FIG. 9 more efficient use of each roofing membrane is made. This will result in an overall need for less square feet of total roofing membrane material compared to the prior art and hence will result in a comparative economic savings.

Reasonable modifications and variations are possible from the foregoing without departing from either the spirit or scope of the present invention.

We claim:

1. An embossed laminate suitable for use as a roofing membrane, said corrugated laminate comprising a top and a bottom layer of plastic film bonded together by a modified bitumen material, wherein (i) the modifier for said bitumen is one selected from the group consisting of thermoplastic elastomers, thermoplastic rubbers, and polyurethanes; (ii) the top layer of said corrugated laminate contains or is surface coated with an ultraviolet light resistant and absorbing agent and, (iii) the corrugating of said laminate assists in the elongation and flexibility of said laminate in the lengthwise direction of the laminate to avoid buckling and cracking of said laminate and assists in the stiffness and rigidity of said laminate in the width direction of said laminate to resist wind uplift of said laminate.

2. A composition according to claim 1 wherein said top and bottom layer of plastic film consist essentially of at least one sheet of plastic film.

3. A composition according to claim 1 wherein said plastic film is at least one selected from the group consisting of polyethylene terepthalate, polymethyl methacrylate, and polyvinyl chloride.

4. A composition according to claim 1 wherein said ultraviolet light resistant and absorbing agent is an acrylic mastic.

5. A composition according to claim 1 wherein said top and bottom layers of plastic film each have a thickness in the range of 0.25-5 mils.

6. A composition according to claim 1 wherein said modified bitumen layer has a thickness in the range of 30-300 mils.

7. A roofing system for protecting an underlying sloped roofing deck comprising a plurality of partially overlapping roofing membranes such that (a) each individual roofing membrane is suitably attached to said sloped roof deck; and (b) said roofing membrane is an corrugated laminate comprising a top and a bottom layer of plastic film bonded together by a modified bitumen material wherein (i) the modifier for said bitumen is one selected from the group consisting of thermpolastic elastomers, thermoplastic rubbers, and polyurethanes; (ii) the top layer of said corrugated laminate either contains or is surface coated with an ultraviolet light resistant and absorbing agent, and (iii) the corrugating of said laminate composition assists in the elongation and flexibility of said laminate in the lengthwise direction of the laminate to avoid buckling and cracking of said laminate and assists in the stiffness and rigidity of said laminate in the width direction of said laminate to resist wind uplift of said laminate.

8. A roofing system according to claim 7 wherein the overlap of each roofing membrane is less than one half the width of the membrane.

* * * * *